United States Patent
Bähr et al.

(10) Patent No.: US 10,527,120 B2
(45) Date of Patent: Jan. 7, 2020

(54) PISTON SLIDE VALVE

(71) Applicant: Rausch & Pausch GmbH, Selb (DE)

(72) Inventors: Sebastian Bähr, Selb (DE); Werner Döhla, Selb (DE)

(73) Assignee: Rausch & Pausch GmbH, Selb (DE)

( * ) Notice: Subject to any disclaimer, the term of this patent is extended or adjusted under 35 U.S.C. 154(b) by 0 days.

(21) Appl. No.: 15/989,510

(22) Filed: May 25, 2018

(65) Prior Publication Data

US 2018/0347722 A1    Dec. 6, 2018

(30) Foreign Application Priority Data

May 30, 2017 (DE) .......................... 10 2017 111 726

(51) Int. Cl.
*F16F 9/34* (2006.01)

(52) U.S. Cl.
CPC ..................................... *F16F 9/34* (2013.01)

(58) Field of Classification Search
CPC ..... F16F 9/34; F16F 2230/24; F16K 31/0693; F16K 31/0668; F16K 31/082; F16K 31/0675
See application file for complete search history.

(56) References Cited

U.S. PATENT DOCUMENTS

| | | |
|---|---|---|
| 4,403,765 A | 9/1983 | Fisher |
| 4,546,955 A * | 10/1985 | Beyer .................. F16K 31/0679 251/129.1 |
| 5,244,063 A | 9/1993 | Laurien et al. |
| 5,996,369 A | 12/1999 | Hirota |
| 9,915,360 B2 * | 3/2018 | Simeon .................. F16K 11/056 |
| 2002/0148991 A1 | 10/2002 | Herbert et al. |

(Continued)

FOREIGN PATENT DOCUMENTS

| | | |
|---|---|---|
| DE | 43 34 350 A1 | 4/1995 |
| DE | 10 2007 057 882 A1 | 6/2009 |

(Continued)

OTHER PUBLICATIONS

Extended European Search Report dated Oct. 12, 2018, including the European Search Report and the European Search Opinion, in connection with corresponding EP Application No. 18174671.0 (16 pgs., including partial machine-generated English translation).

*Primary Examiner* — Eric Keasel
(74) *Attorney, Agent, or Firm* — Maier & Maier, PLLC

(57) ABSTRACT

An electromagnetically actuated piston slide valve includes a piston slide arrangement with a piston which is axially displaceable for regulating a free cross section of a fluid passage of the valve. The piston slide arrangement contains a first magnetic armature connected to the piston and a second magnetic armature which is axially displaceable with respect to the piston. The piston is axially displaceable against the force of a first biasing spring by generating an electromagnetic field through energizing a coil. A second biasing spring rests against the first magnetic armature and the second magnetic armature, so, in the unenergized state of the coil, the piston takes a predetermined position by axial displacement due to the force of the first biasing device against the force of the first biasing device. A permanent magnet generates an attractive force between the first and the second magnetic armature which counteracts the second biasing spring.

10 Claims, 5 Drawing Sheets

(56) References Cited

U.S. PATENT DOCUMENTS

2007/0040135 A1    2/2007  Dyer et al.
2016/0153568 A1*  6/2016  Simeon ................ F16K 11/056
                                                      137/625.48

FOREIGN PATENT DOCUMENTS

| DE | 10 2008 035 899 A1 | 2/2010 |
| DE | 10 2011 078 104 A1 | 12/2012 |
| DE | 10 2013 106 214 A1 | 12/2014 |
| EP | 1 538 366 A1 | 6/2005 |
| EP | 3 026 310 A1 | 6/2016 |

* cited by examiner

PISTON SLIDE VALVE

FIELD

The present invention relates to a piston slide valve, for example for a shock absorber of a vehicle.

BACKGROUND

An electromagnetically actuated piston slide valve can be used as a throttle valve in a hydraulic shock absorber of a vehicle in order to adjust a shock-absorber characteristic to be "hard" or "soft". By means of the adjustable throttle valve the flow resistance of the valve and thereby the shock-absorbing effect of the entire system can be changed in dependence on the electrical energizing of the field coil of the valve. The valve connects two shock-absorber chambers here, wherein pressure surges on the shock absorber cause a fluid displacement from one shock-absorber chamber into the other shock-absorber chamber.

In dependence on the application, it may be required that the valve is closed ("normal closed", NC) or open ("normal open", NO) in the currentless state. When the valve takes a predetermined position in the currentless state, this is also referred to as fail-safe state, since the valve takes this state when the entire system is turned off or fails, for example when the power supply breaks down. This fail-safe function is used in shock-absorbers for motor vehicles, for example. It can be advantageous when the fail-safe state defines a partly opened state of the valve, so that in the case of a system failure the shock absorber does not switch to a very soft or hard setting, in order to ensure a moderate and secure driving condition thereby.

From DE 10 2008 035 899 A1 and DE 10 2013 106 214 A1 electromagnetically actuated NO valves are known. These valves have a fail-safe position in which the valve is partly opened, i.e. a position between the maximally opened and closed the position in the unenergized state. When the coil of the valve is electrically energized, the piston (also referred to as slide) of the valve initially moves to the maximally opened position and can be held there with a basic energy supply, i.e. a minimum energy supply that is required for keeping the valve maximally open. When the current is further increased, the slide moves continuously in the direction of the closed position.

These valves have two magnetic armatures and two corresponding biasing springs. In order to hold the valve in the maximally opened position, a minimal magnetic force is necessary and in a "basic energy supply" in order to overcome the force of the fail-safe spring, i.e. that spring which urges the piston in the direction of the fail-safe position. When the energy supply is lowered below the basic energy supply, the valve switches to the fail-safe state. A lowering of the basic energy supply is thus impossible. Also external influences, such as vibrations due to unevenness of the road surface, can likewise have the result that with basic energy supply the valve unintentionally switches from the maximally opened position into the fail-safe position. Moreover, the fail-safe spring cannot be configured with any desired stiffness, and thus the fail-safe stroke cannot be configured with any desired dimension, since the valve would otherwise switch to the fail-safe state too easily. Put differently, a stiff fail-safe spring requires a high basic energy supply for overcoming the biasing force of the fail-safe spring and for holding the maximally opened position of the valve.

SUMMARY

It is therefore the object of the invention to make available an electromagnetically actuated piston slide valve which has a fail-safe function at low electric basic electrical energy supply, a large fail-safe stroke of the valve and stability against external disturbing influences.

A piston slide valve according to the invention comprises a piston slide arrangement with a piston which is axially displaceable in a valve housing for regulating a free cross section area of a fluid passage between a first fluid connector and a second fluid connector of the valve. Further, the piston slide arrangement comprises a first magnetic armature connected to the piston and a second magnetic armature which is axially displaceable with reference to the piston, as well as a first biasing device and a second biasing device. In particular, the first and the second biasing device can be a biasing spring in each case. The first magnetic armature is connected to the piston, i.e. it moves axially together with the piston. In particular, the connection can be referred to as "permanent" or "stationary", wherein the first magnetic armature and the piston do not necessarily have to be interconnected inseparably.

By generating an electromagnetic field by energizing a coil, the piston is axially displaceable against the force of the first biasing device. At the same time, the second biasing device rests against the first magnetic armature and the second magnetic armature, so that, in the unenergized state of the coil, the piston takes a predetermined position through axial displacement due to the force of the second biasing device against the force of the first biasing device. The predetermined position defines the fail-safe position of the valve explained at the outset and is taken in particular during the transition from the energized state to the unenergized state of the valve, i.e. in particular when the valve is turned off or upon a system failure. The piston slide valve according to the invention can be used advantageously in a shock absorber for a motor vehicle.

According to the invention, the piston slide valve further comprises a permanent magnet, which acts on at least one of the first magnetic armature and the second magnetic armature such that a magnetic force caused by the permanent magnet counteracts the force of the second biasing device. The magnetic force acts in particular in an energized state of the valve, in which the current intensity is larger or equal to a basic energy supply. When the term "magnet" is used in the following description, the permanent magnet is meant. In the event that the electromagnet, i.e. in particular the coil, of the valve is meant, this will be specified explicitly. The basic energy supply defines the minimum current intensity which is necessary for overcoming the force of the second biasing device and for example for holding a maximally opened position of the valve.

By providing a permanent magnet counteracting the force of the second biasing device the disadvantages described at the outset can be overcome. In particular, the permanent magnet permits a lower basic electrical energy supply of the valve, since it supports the position, e.g. the maximally opened position, reached through the basic energy supply of the valve, meaning that it contributes to holding this position without the valve switching back to the fail-safe position unintentionally. A substantially reduced energy consumption can be achieved thereby, since several valves, for example up to eight valves, can be installed in a vehicle. In addition, a harder fail-safe coordination becomes possible, i.e. a larger fail-safe stroke of the slide or piston. The piston slide valve according to the invention with the position of the valve achieved through the basic energy supply has an increased robustness with respect to disturbing influences, e.g. mechanical excitation of the valve from the outside or flow forces. Overall, an expansion of the regulation range of the vale with a better resolution can be achieved thereby.

Preferably, the permanent magnet is arranged such that the magnetic force caused by the permanent magnet moves the first magnetic armature and the second magnetic armature towards each other. In particular, the permanent magnet can be arranged such that it exerts an attractive force between the first magnetic armature and the second magnetic armature. This can be the case in particular when the second biasing device is arranged such that it pushes the first magnetic armature and the second magnetic armature apart. The magnetic force of the permanent magnet supports the holding force between the first and the second magnetic armature.

As already indicated briefly, the described effect of the magnetic force generally acts in particular on a state of the valve in which at least the basic energy supply is applied. In other words, the magnetic force is described for a state of the valve in which the first magnetic armature and the second magnetic armature are arranged sufficiently close to each other, in particular are directly adjacent to each other, and optionally touch each other. This position of the valve is achieved in particular by applying the basic energy supply, which overcomes the force of the second biasing device, i.e. in particular the fail-safe spring, which rests against the first and the second magnetic armature. In contrast, the first magnetic armature and the second magnetic armature are possibly too far away from each other in the unenergized state, so that the permanent magnet cannot develop a relevant force between the first magnetic armature and the second magnetic armature, i.e. in particular no or only a very small force, which counteracts the force of the second biasing device.

The permanent magnet can be arranged in particular between the first magnetic armature and the second magnetic armature. Advantageously, the permanent magnet is arranged in at least one of the first magnetic armature and the second magnetic armature. The magnet can be arranged in the first magnetic armature, for example. It is understood that the magnet can also be arranged in the second magnetic armature alternatively. It is also conceivable that at least one permanent magnet is provided in both the first and the second magnetic armature. These can be arranged for example in the radial direction in mutually offset manner, or in axially mutually aligned manner, taking account of the direction of the magnetization, so that a force is reached by the permanent magnets which counteracts the force of the second biasing device.

For example, the permanent magnet can be inserted or embedded in the corresponding magnetic armature, e.g. mounted as a separate component or molded in as well in the injection molding process. By arranging the magnet in the magnetic armature the construction size of the valve remains unchanged and no additional construction space is necessary. A further advantage of positioning the magnet in the magnetic armature is that in the case of an arrangement in the magnetic armature—thus on a small diameter—a relatively small volume of the permanent magnet is already sufficient to raise the holding force significantly.

By arranging the magnet in one of the magnetic armatures (or possibly in both magnetic armatures) a magnetic circuit is closed around the magnet that encompasses both armatures. It is thus ensured that the magnet contributes only to an increase of the attractive force between the magnetic armatures. Positioning in a different place in the magnetic circuit (e.g. in a transfer disk) would result in a magnet-driven flow, which, in addition to the gap between the two magnetic armatures, passes also the operation air gap between the first magnetic armature and a stationary pole part. This would increase the magnetic force during regular operation in addition to the holding force between the magnetic armatures. The force of the first biasing spring would have to be increased accordingly. To avoid reducing the fail-safe stroke, the fail-safe spring force would have to increase simultaneously in this case. The increase in holding force would be compensated thereby.

Advantageously, the permanent magnet is arranged in at least one of the first magnetic armature and the second magnetic armature near a surface which faces the correspondingly other one of the first and the second magnetic armature. As mentioned, the magnet can be inserted in the corresponding magnetic armature, for example inserted in a recess in the surface of the magnetic armature. It would be theoretically conceivable that the permanent magnet is embedded in the corresponding magnetic armature near the surface, so that the magnet is enclosed completely by the material of the magnetic armature. However, the complete embedding of the permanent magnet impairs the formation of the magnetic flux on the contact area of the two magnetic armatures. Therefore, the permanent magnet is preferably at least partly exposed.

Advantageously the permanent magnet is magnetized substantially in the axial direction, so that it can optimally counteract an axial force of the second biasing device. In other words, the permanent magnet is magnetized preferably in a direction parallel to the force of the second biasing device. Preferably, the magnetic force caused by the permanent magnet is weaker than the force of the second biasing device, so that the force of the second biasing device in the unenergized state of the valve exceeds the magnetic force and the piston can take the predetermined position, i.e. the valve can take the fail-safe position. However, the magnetic force of the permanent magnet is sufficiently high to support the position of the valve during basic energy supply, as explained.

The permanent magnet can be configured as a ring magnet or at least comprise a ring magnet. It is understood that also other shapes of the magnet are conceivable, for example ring magnet segments, or other non-annular elements. The permanent magnet can be configured in single-piece manner or can comprise several parts. For example, several single magnets can be arranged around the longitudinal axis of the magnetic armature, in particular arranged regularly. The single magnets can have any desired suitable shape in this case.

In order to further optimize the holding force between the first magnetic armature and the second magnetic armature during basic energy supply of the valve, a step or recess can be provided on a front side of the first or second magnetic armature, which, during basic energy supply of the valve, is adjacent to a corresponding front side of the correspondingly other one of the first and second magnetic armature. Thereby the contact area between the two magnetic armatures is reduced and the magnetic flux is concentrated to the relatively small contact area, resulting in an increased magnetic flow density and thereby an increased holding force between the two magnetic armatures.

BRIEF DESCRIPTION OF THE DRAWINGS

The invention will hereinafter be described with reference to the attached drawings. The drawings are merely schematic representations and the invention is not limited to the specific represented embodiment examples. The valve according to the invention is represented in FIG. 3 in particular. FIGS. 1 and 2 show known valves, which do not contain all features of the invention, but are described in order to explain the valve according to the invention.

FIG. 1 shows a sectional representation of a NO piston slide valve in the unenergized state.

DETAILED DESCRIPTION

Figure 1:
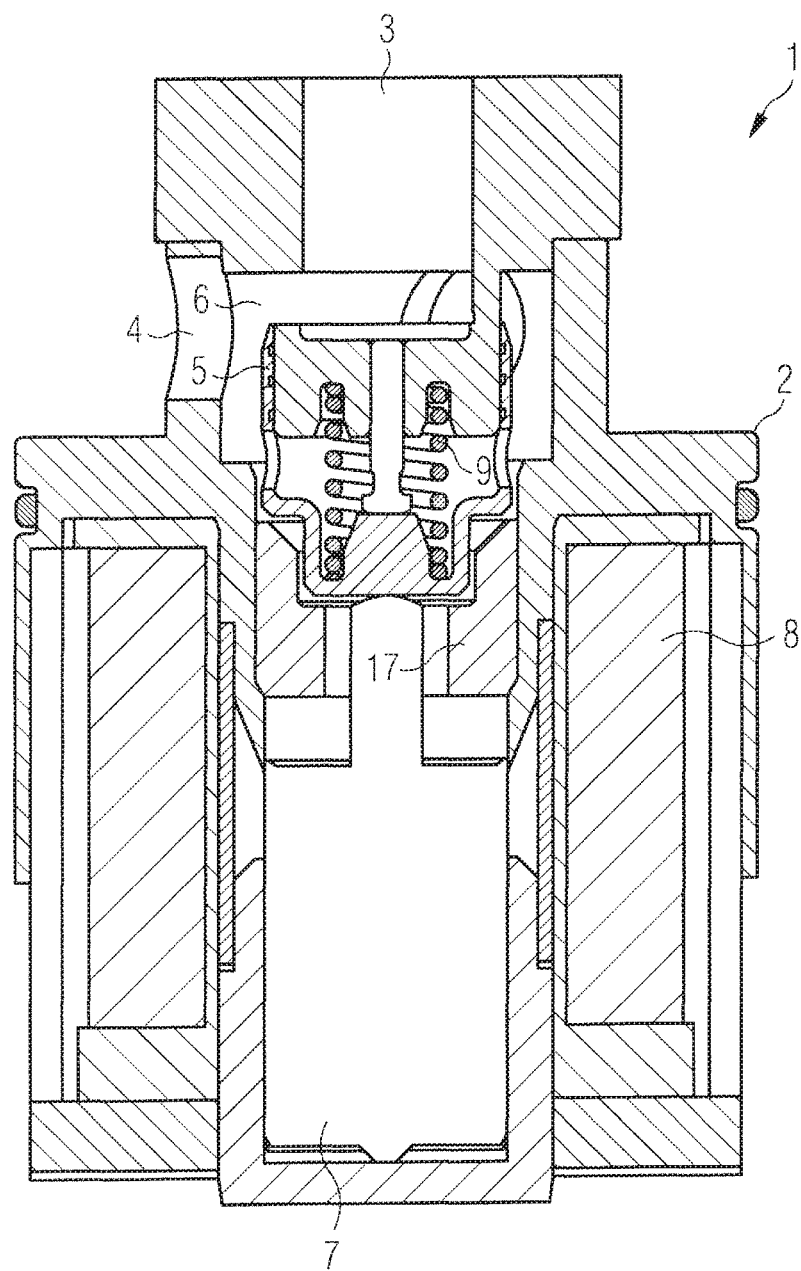

In FIG. 1 a known piston slide valve 1 is represented in a sectional view, in order to briefly explain the operation mode in principle. In the unenergized state represented in FIG. 1 the valve 1 is opened, i.e. this is a piston slide valve 1 of the NO construction type ("normal open"). The valve 1 has a valve housing 1 with a first fluid connector 3, which can be a fluid inlet depending on the application, and a second fluid connector 4, which can be a fluid outlet depending on the application. In this embodiment example the fluid inlet 3 is arranged axially and the fluid outlet 4 comprises several radial openings. A piston 5, which can also be referred to as slide or piston slide and can be configured to be hollow in particular, is arranged in axially displaceable manner in the valve housing 2, in order to open and close a fluid passage 6 between the first fluid connector 3 and the second fluid connector 4, more exactly to regulate a free cross section of the fluid passage 6. Such a slide is known for example from EP 1 538 366 A1. It is understood that the present invention is not limited to such a slide configuration, but that also different slide or piston constructions can be employed for regulating a free cross section of a fluid passage.

The piston 5 is connected to a magnetic armature 7, so that the piston 5 and the magnetic armature 7 move together. The magnetic armature 7—and thus the piston 5—is axially displaceable by means of the magnetic field generated by a coil 8. When the coil 8 is energized, a magnetic force acts in a closed magnetic circuit, and the piston 5 is moved thereby against the force of a biasing spring 9 in the direction of a stationary pole part 17. The biasing spring 9, which can also be referred to as regulating spring, rests against the valve housing 2 and the piston 5 and in the embodiment example shown here forces the piston 5 into a position in which the fluid passage 6 is maximally opened. In other words, in the unenergized state of the coil 8 of the valve 1 the fluid passage 6 is maximally opened, i.e. the valve 1 is normal open (NO). Alternatively (not represented), the piston 5 could also be forced by means of the biasing spring 9 into a position in which the fluid passage 6 is closed (normal closed, NC).

Figure 2A:
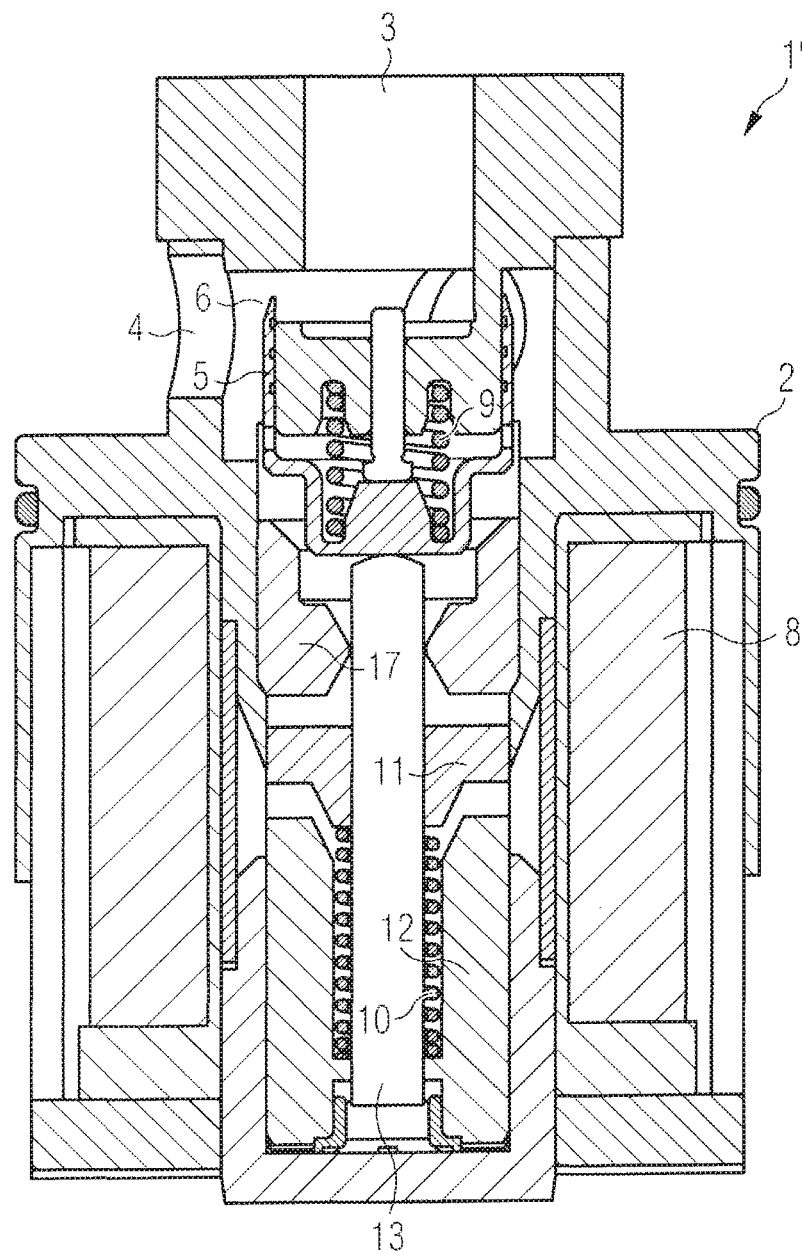
FIG. 2A shows a sectional representation of a NO piston slide valve with a fail-safe function in the unenergized state.
Figure 2B:
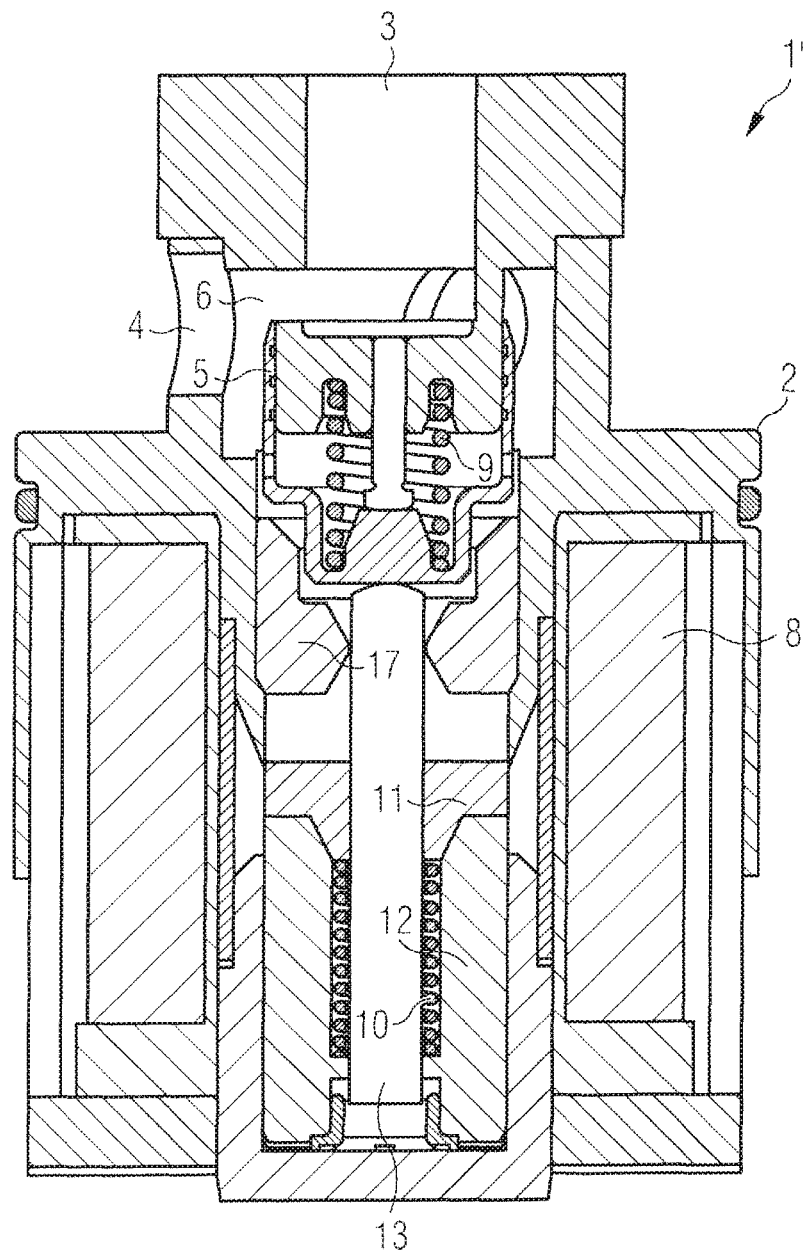
FIG. 2B shows a sectional representation of the piston slide valve of FIG. 2A in the opened state during basic energy supply.

FIGS. 2A and 2B show a piston slide valve 1', which is constructed in principle similarly to the piston slide valve 1 shown in FIG. 1, hence the same reference numerals are employed for corresponding parts. However, the piston slide valve 1' shown in FIGS. 2A and 2B has a so-called fail-safe function. In this embodiment example, the valve 1 takes a position in the unenergized state in which the fluid passage 6 is neither maximally opened nor completely closed, but partially opened. When used in a shock absorber of a motor vehicle, a shock-absorbing characteristic is reached thereby which is neither completely hard nor completely soft, so that the vehicle has a moderate shock-absorbing characteristic for example in the event of a failure of the system.

The fail-safe function is achieved by a bisection of the magnetic armature and by providing a second biasing spring in addition to the regulation spring 9. The second biasing spring 10 is arranged between the first magnetic armature 11, which can be referred to as regulation armature, and the second magnetic armature 12, which can be referred to as fail-safe armature, and pushes the two magnetic armatures 11, 12 apart from each other. The first magnetic armature 11 is permanently connected to a piston rod 13 of the piston 5, whereas the second magnetic armature 12 is axially displaceable on the piston rod 13. In the unenergized state of the valve 1' represented in FIG. 2A, the force of the second biasing spring 10 counteracts the force of the first biasing spring 9 until an equilibrium of forces is reached and the valve 1' thus takes the partially opened position shown in FIG. 2A.

When the coil 8 of the valve 1' is energized now, as of reaching a basic energy supply the force of the second biasing spring 10 will be overcome by an electromagnetic attractive force between the two magnetic armatures 11, 12, so that the two magnetic armatures 11, 12 adjoin each other at the front sides. During basic energy supply, the fluid passage 6 is maximally opened, as represented in FIG. 2B. When the current intensity is increased further, the first magnetic armature 11 and the second magnetic armature 12 move as one unit against the force of the first biasing spring 9 and the valve 1' is closed (not represented).

When the system is turned off or fails, i.e. when the energy supply is turned off or fails, the second biasing spring 10 pushes the first and second magnetic armature 11, 12 apart again against the force of the first biasing spring 9, so that the valve takes the position shown in FIG. 2A, i.e. the fail-safe position. However, the valve 1' is not intended to take the fail-safe position unintentionally, for example due to vibrations when the road surface is uneven. Therefore, a sufficient basic energy supply is required to hold the position shown in FIG. 2B. This means that sufficient electromagnetic force has to be generated in order to overcome the force of the second biasing spring 10 and to achieve a sufficient force surplus, i.e. holding force, between the first and the second magnetic armature 11, 12.

Figure 3:
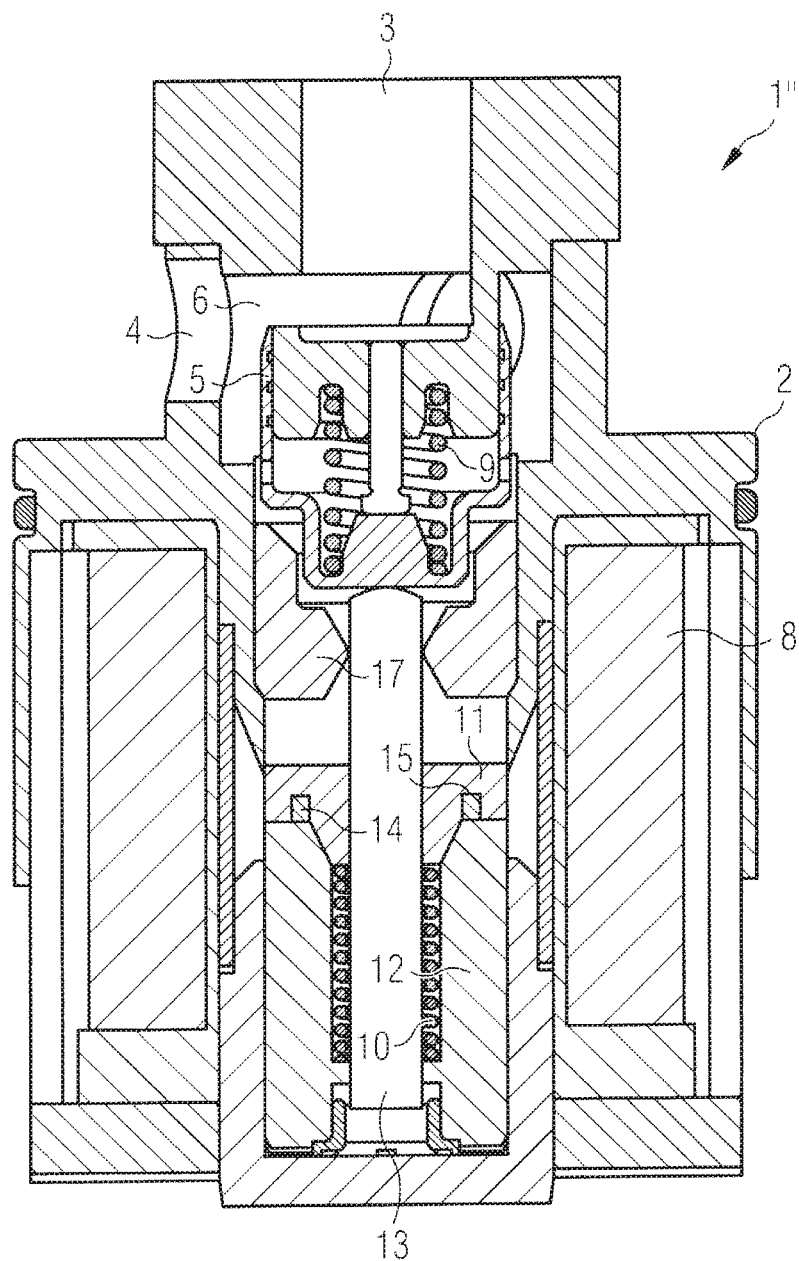
FIG. 3 shows a sectional representation of a piston slide valve according to the invention in the opened state during basic energy supply.

In FIG. 3 a piston slide valve 1" according to the invention is represented. The position of the valve 1" represented in FIG. 3 corresponds to the position of the valve 1' represented in FIG. 2B. Reference is made to the description of FIG. 2B in this regard, and the same reference numerals are employed for corresponding parts. In contrast to the piston slide valve 1' represented in FIGS. 2A and 2B, the valve 1" according to the invention represented in FIG. 3 has a permanent magnet 14, which contributes to holding the maximally opened position of the valve 1" represented in FIG. 3. For this purpose the permanent magnet 14 is arranged between the first magnetic armature 11 and the second magnetic armature 12 to generate an attractive force between the first and the second magnetic armature 11, 12 which counteracts the force of the second biasing spring 10.

In particular in the state of the valve 1" represented in FIG. 3, i.e. during basic energy supply, in which the first and the second magnetic armature 11, 12 adjoin each other, the magnetic attractive force generated by the permanent magnet 14 is reached between the first and the second magnetic armature 11, 12. In contrast, in the unenergized state of the valve 1" (see FIG. 2A), in which the two magnetic armatures 11, 12 are mutually spaced apart and pushed apart by the second biasing spring 10, no or only a very small attractive force between the first and the second magnetic armature 11, 12 is achieved by the permanent magnet 14, since the attractive force strongly decreases in line with a growing spacing of the magnetic armatures 11, 12. The characteristic of the second biasing spring 10 in contrast is substantially linear to the spacing of the two magnetic armatures 11, 12.

As represented in FIG. 3, the permanent magnet 14 is arranged in the first magnetic armature 11. For example, the permanent magnet 14 can be configured as a ring magnet, which is inserted in a correspondingly annular recess 15 on a front side 16 of the first magnetic armature 11 (see also FIG. 4). However, as explained above, the permanent magnet 14 can have any other desired shapes and can be inserted or embedded in the magnetic armature 11. The arrangement of the permanent magnet within the magnetic armature 11 has several advantages. On the one hand, a magnetic circuit is closed encompassing both magnetic armatures 11, 12, so that the magnet 14 only increases the attractive force between the two magnetic armatures 11, 12, but does not interfere with the electromagnetic circuit and for example also increase the attractive force with respect to the pole part 17. This would require disadvantageously a stronger regulation spring 9 and thus a higher basic energy supply for reaching the maximally opened position of the valve.

The attractive force between the first and the second magnetic armature 11, 12 generated by the permanent magnet 14 counteracts the force of the second biasing spring 10 and increases the holding force between the first magnetic armature 11 and the second magnetic armature 12 generated by the basic energy supply. The basic energy supply necessary for holding the maximally opened position of the valve 1" can therefore be reduced in comparison to a valve without the permanent magnet 14 (for example the valve 1' shown in FIGS. 2A and 2B).

Figure 4:
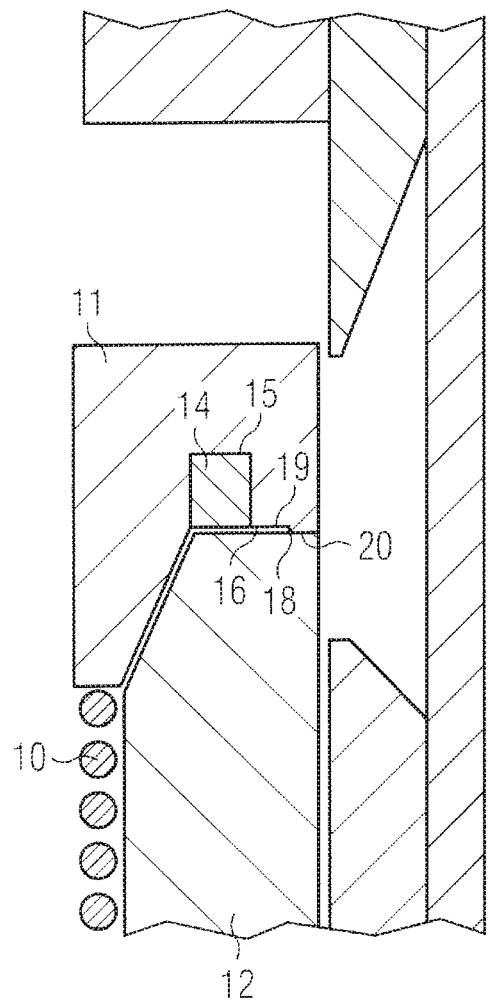
FIG. 4 shows a sectional representation of a detail of the piston slide valve of FIG. 3.

In the detail of the valve 1" of FIG. 3 shown in FIG. 4 a further measure is recognizable which can improve the holding force between the first magnetic armature 11 and the second magnetic armature 12. The first magnetic armature 11 has a shallow step 18 on its front side 16 facing in the direction of the second magnetic armature 12. Put differently, the front side 16 of the first magnetic armature has a slightly backwardly offset region 19 which can be a radially inner region in particular. For this reason, there is a direct contact between the first magnetic armature 11 and the second magnetic armature 12 only at an outer edge. In this manner, the magnetic flux is concentrated to a small contact area 20, so that the magnetic flux density increases there, which, in turn, generates an increased holding force between the two magnetic armatures 11, 12. It is understood that also other configurations of the front side of the first magnetic armature 11 and the second magnetic armature 12 are conceivable to reduce the contact area 20, to increase the holding force. This measure can be provided in addition to arranging a permanent magnet.

Figure 5:
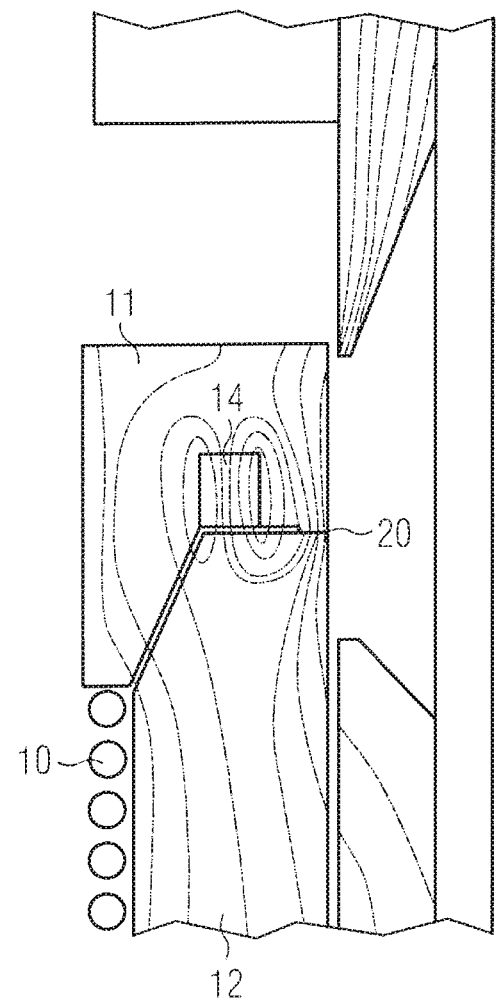
FIG. 5 shows the detail of the piston slide valve according to FIG. 4, including magnetic field lines.

FIG. 5 shows approximately the path of the magnetic field lines around the permanent magnet 14 between the two magnetic armatures 11, 12 when the coil is energized. It can be recognized in particular that the permanent magnet 14 is magnetized in the axial direction, to improve the holding force between the first and the second magnetic armature 11, 12 and to optimally counteract the force of the second biasing spring 10. The highest magnetic flux density between the two magnetic armatures occurs at the contact area of the two magnetic armatures (see FIG. 4).

The invention claimed is:

1. An electromagnetically actuated piston slide valve, comprising:
    a valve housing with a first fluid connector and a second fluid connector and at least one fluid passage connecting the two fluid connectors, and
    a piston slide arrangement with a piston which is axially displaceable in the valve housing for regulating a free cross section of the fluid passage, a first magnetic armature connected to the piston and a second magnetic armature which is axially displaceable with respect to the piston, as well as a first biasing device and a second biasing device,
    wherein the piston is axially displaceable against the force of the first biasing device by generating an electromagnetic field through energizing a coil, and wherein the second biasing device rests against the first magnetic armature and the second magnetic armature, so that, in the unenergized state of the coil, the piston takes a predetermined position by axial displacement due to the force of the second biasing device against the force of the first biasing device, and
    wherein the piston slide valve further comprises a permanent magnet which acts in such a manner on at least one of the first magnetic armature and the second magnetic armature that a magnetic force caused by the permanent magnet counteracts the force of the second biasing device.

2. The piston slide valve according to claim 1, wherein the permanent magnet is arranged such that the magnetic force caused by the permanent magnet moves the first magnetic armature and the second magnetic armature towards each other.

3. The piston slide valve according to claim 1, wherein the permanent magnet is arranged such that it exerts an attractive force between the first magnetic armature and the second magnetic armature.

4. The piston slide valve according to claim 1, wherein the permanent magnet is arranged between the first magnetic armature and the second magnetic armature.

5. The piston slide valve according to claim 1, wherein the permanent magnet is arranged in at least one of the first magnetic armature and the second magnetic armature.

6. The piston slide valve according to claim 5, wherein the permanent magnet is arranged in at least one of the first magnetic armature and the second magnetic armature near a surface which faces the correspondingly other one of the first and the second magnetic armature.

7. The piston slide valve according to claim 5, wherein the permanent magnet is embedded or inserted in at least one of the first magnetic armature and the second magnetic armature.

8. The piston slide valve according to claim 1, wherein the magnetic force caused by the permanent magnet is weaker than the force of the second biasing device.

9. A piston slide valve according to claim 1, wherein the permanent magnet is a ring magnet.

10. The piston slide valve according to claim 1, wherein the permanent magnet is magnetized in the axial direction.

* * * * *